3,405,062
LOW LIQUID LOSS COMPOSITION
David A. Kuhn, Ponca City, Okla., assignor to Continental Oil Company, Ponca City, Okla., a corporation of Delaware
No Drawing. Filed Jan. 25, 1965, Ser. No. 427,942
4 Claims. (Cl. 252—8.55)

This invention relates to an improved composition and method useful in hydraulically fracturing a subterranean formation. More particularly, this invention relates to a fluid loss control additive for viscous aqueous-base fracturing fluid and to a method of fracturing a well therewith to increase the permeability to fluids of the formation surrounding the well.

It is oftentimes desirable to increase the rate of flow of fluids into or out of subterranean reservoirs such as during flooding operations or production of well fluids. One means of increasing such rate of fluid flow is by fracturing the subterranean formations. A popular method of fracturing is hydraulic fracturing in which a fluid, called the fracturing fluid, is pumped into a well into contact with the formation at a pressure sufficient to lift the overburden and part or fracture the formation. After the initial breakdown of the formation has occurred, a propping agent is generally added to the stream of fracturing fluid being pumped into the well to extend the fracture. Propping agents are solid particles, such as sand, walnut shells, glass beads, aluminum pellets, plastic and the like, which are partially deposited in the fracture and prop the fracture open at the completion of the treatment, thus enhancing the flow of fluids through the fracture.

Due to their ready availability and economic advantages, aqueous-base fracturing fluids are widely used. Such fluids may take various forms such as fresh water, brine, acid, gelled water, and gelled brine. In fracturing, it is generally desirable to extend the fracture as far away from the well bore as possible. An increase in the viscosity of the fracturing fluid increases its ability to carry propping agent. Hence, as compared to water, a viscous aqueous fracturing fluid allows the propping agent to be carried farther out into the formation and thus lengthen the fracture.

Another important characteristic of a fracturing fluid is its fluid loss or leak off. In order to build up the high pressures necessary to initiate and extend the fracture, it is necessary that the fracturing fluid penetrate and leak off into the formation to as limited an extent as possible. Also, a fracturing fluid having low fluid loss is an efficient fluid in that a greater portion of each volume of such a fluid is utilized in enlarging the fracture area and fluid leaking off into the formation which fails to contribute to fracture extension is minimized. Various additives are known which help control this fluid loss. These additives are generally finely divided solids which tend to plate out, temporarily plug and plaster the faces of the formation exposed to the fracturing fluid, thus sharply decreasing the flow of fluids out into the formation. Although progress has been made in controlling penetration of fracturing fluids through the use of such additaments, there is still appreciable loss experienced upon the use of fracturing fluids containing known fluid loss additives. It has been the experience that a particular additive which might give good leak off control in one type of aqueous media will be relatively ineffective in another type. For example, one additive may be satisfactory in fresh water but give poor results in brine, while another additive may operate fine in either fresh water or brine but give little penetration control in gelled aqueous media.

One of the most widely used fluid loss additives for aqueous media is finely particulated sand, i.e., silica flour. Various gums have some slight fluid loss control in water, but are generally more widely used for their ability to thicken water. A highly popular viscous aqueous fracturing fluid uses guar gum to thicken water. Gelled water commonly used in fracturing operations often contains 40 or more pounds per 1000 gallons guar gum. It has been found that addition of the gum thickening agent to water containing silica flour fluid loss additive improves the fluid loss control when using gum at concentrations up to about 15 to 20 pounds per 1000 gallons. However, when the gum concentration is increased to above about 35 pounds per 1000 gallons, the fluid loss control of the system is markedly decreased. Therefore, a substitute must be found for silica flour when employing gum-thickened aqueous base fracturing fluids of the type normally used.

An important object of this invention is to provide a fracturing liquid composition having low liquid loss characteristics. A further object is to provide a low liquid loss additive which can be used in gum-thickened aqueous base fracturing compositions. A still further object is to provide a single-component low fluid loss additive for use in gelled aqueous base fracturing compositions. Various other objects, advantages and features of the invention will become apparent from the following detailed description.

The objects of this invention are attained by conducting hydraulic fracturing operations in subterranean reservoirs traversed by well bores with a novel water base fracturing composition. The hydraulic fracturing is accomplished with a major portion of gelled water as a carrier and a minor portion of a low density solid silicate material as the fluid loss additive. This invention is directed to the fracturing fluid composition containing the additive and the process of utilizing the composition in a hydraulic fracturing operation.

The water used as the carrier or vehicle for the water base fracturing composition of this invention may be substantially any water, such as that available at the site of the well wherein the hydraulic fracturing operation is to be conducted. The use of available water from surface storage or wells eliminates the necessity of transporting specially treated water to the site or treating the available water in some special manner. Therefore, the carrier water can be fresh water, water containing traces of foreign material or brines. These brines may conveniently be those from the well being fractured.

The viscosity of water may be increased by adding thereto any of a large number of thickeners, such as water-soluble natural and synthetic gums or polymeric materials. Operable natural gums include guar, dextran, karaya, locust bean, arabic, algin, tragacanth, talha and damar. Especially useful is guar gum which is essentially a straight-chain polymer of mannose units linked in a 1-4-betaglucosidic linkage and having galactose branching on alternate mannose units. Synthetic gums which may be used are polymers of acrylamide, ethylene oxide or a monoalkenylaromatic sulfonate. Polyacrylamide is obtained by well known polymerization procedures under the influence of a catalyst such as benzoyl peroxide. The polymers may be used as obtained after polymerization or partially hydrolyzed by the reaction of the polymer with a sufficient amount of a base, such as sodium hydroxide, to hydrolyze a portion of the amide groups present in the polymer molecule. The ethylene oxide polymers which are effective are those characterized by a minimum of cross-linkages and high molecular weights of from about 1 to about 10 million. Suitable polymers of monoalkenylaromatic sulfonates include linear high molecular weight polymers of styrene-sulfonic acids and the various substituted styrene-sulfonic acids.

The low density solid silicate materials that can be used as the fluid loss control additives are those having a configuration in which two of the dimensions of each particle are substantially greater than the third dimension. The surfaces of these particles may be flat or may have some curvature and may be described generally as being essentially flat, planar, homaloidal or arcuate in character. Thus, the particles have a high surface-to-volume ratio. One example of such a material is perlite, a volacanic lava composed mostly of aluminum silicates which is processed into the form of small hollow glassy shells by sintering in a furnace to change the water of crystallization to steam and thus expand the ore in a manner similar to the manufacture of edible puffed cereals. This expansion breaks up the shells producing a profusion of arcuate-shaped particles. The gum thickening agent is employed in an amount sufficient to gel water, i.e., increase the viscosity thereof. Generally, between 3 and 200 pounds or higher per 1000 gallons fracturing fluid is used. The preferred range is from 5 to 100 pounds per 1000 gallons fracturing fluid. By low density is meant those materials having a bulk density of from about 8 to about 18 pounds per cubic foot. For example, the bulk density of perlite is from 10 to 13 pounds per cubic foot.

The low density solid silicate material is used in a fluid-loss-controlling amount. Broadly speaking, between 2 and 200 pounds per 1000 gallons fracturing fluid is satisfactory. The peferred concentration range is between 5 and 100 pounds per 1000 gallons fracturing fluid.

It is not considered that particle size of the water thickener or the low density silicate material is of critical importance. Each of the materials may be used as purchased in particulate form through ordinary commercial channels with no special grinding or milling required. A particle size distribution made on a typical perlite sample showed 15.1 percent above 10 microns, 38.6 percent above 5 microns, 58.0 percent above 2.5 microns, 89.1 percent above 1 micron and 99.0 percent above 0.5 micron.

A series of tests, reported in the table below, were made in accordance with A.P.I.R.P. 39, "Recommended Practice Standard Procedure for the Evaluation of Hydraulic Fracturing Fluids," Section V, Fluid Loss, with the exception that the filter medium was three thicknesses of Whatman No. 50 filter paper, rather than only one such filter paper, and filtration loss in milliliters was measured after 30 minutes. All tests were made at 1000 p.s.i. and 125° F.

TABLE.—FLUID LOSS OF GUM THICKENED WATER CONTAINING PERLITE FLUID LOSS CONTROL ADDITIVE

| Example | Aqueous media | Concentrated guar gum (lbs./1,000 gal.) | Concentrated perlite (lbs./1,000 gal.) | Fluid loss (ml./30 min.) |
| --- | --- | --- | --- | --- |
| 1 | Fresh water | None | 100 | *Blew out |
| 2 | do | 20.0 | None | 43.6 |
| 3 | do | 20.0 | 100 | 26.0 |
| 4 | do | 2.5 | 100 | 53.7 |
| 5 | do | 5.0 | 100 | 42.4 |
| 6 | do | 10.0 | 100 | 33.4 |
| 7 | do | 40.0 | 100 | 16.0 |
| 8 | do | 60.0 | 100 | 14.8 |
| 9 | do | 40.0 | 2.5 | 27.7 |
| 10 | do | 40.0 | 5.0 | 22.2 |
| 11 | do | 40.0 | 10.0 | 17.0 |
| 12 | do | 40.0 | 20.0 | 16.7 |
| 13 | do | 40.0 | 50.0 | 17.0 |
| 14 | 10% sodium chloride brine | 20.0 | 100 | 21.4 |
| 15 | do | 40.0 | 100 | 17.5 |

*The entire 170 ml. capacity of the filter press blew through the filter media in 4.5 minutes.

Examples 1 through 3 above show that perlite is an effective fluid loss for gelled water but not for fresh water. Examples 4 through 8 show the effect of various concentrations of gum. Considerable fluid loss control can be achieved at gum concentrations as low as 2.5 pounds per 1000 gallons fracturing fluid. Concentrations of gum greater than 60 pounds per 1000 gallons are seldom required. Examples 9 through 13 show the effect of various concentrations of perlite. Acceptable fluid loss control of gelled water can be achieved using as low as 2.5 pounds per 1000 gallons perlite. More than about 100 pounds per 1000 gallons perlite is not required, although more than this amount is not harmful. Examples 14 and 15 illustrate that perlite is effective in gum gelled brine.

Field example

The procedure for carrying out the process of hydraulically fracturing a well using the low fluid loss medium of this invention is as follows: A cased well has a total depth of 4700 feet and a pay zone extending between 4610 and 4620 feet, which pay zone is perforated with four perforations per foot. The well is provided with a 2½ inch tubing extending to a depth of 4600 feet. A retrievable packer is positioned in the annulus between the tubing and the casing near the lower end of the tubing. The annular space above the packer is filled with water to resist the upward thrust of the packer during treatment. The fracturing fluid is prepared in a mixing tank by adding 2000 pounds guar gum to 50,000 gallons water and agitating the mixture for 30 minutes to allow the gel to form. As this fracturing fluid is pumped from the mixing tank down the tubing, 2500 pounds finely divided perlite as fluid loss additive and 50,000 pounds 20 to 40 mesh sand as propping agent are blended into the composition. Following conventional fracturing procedures, the resulting mixture is pumped down the tubing, through the perforations and against the formation. The pressure is raised until the formation breaks down, i.e., fractures and begins to accept the fracturing fluid mixture. Pumping is continued as the fracture is extended by additional fracturing medium entering the fracture. Due to the presence of the perlite additive, leak off into the formation is negligible and most of the fracturing medium is utilized in extending the fracture area. The fracturing fluid is followed by a flush of 2000 gallons water. The fracturing pressure is then bled off and the well returned to service.

From the foregoing description of the invention, it will be obvious to those skilled in the art that many variations and modifications may be made in the compositions and processes of this invention without departing from the spirit and scope thereof.

I claim:
1. A low fluid loss aqueous well fracturing composition comprising:
  (a) 40 to 200 pounds per 1000 gallons of a water-soluble gum,
  (b) 2 to 200 pounds per 1000 gallons of perlite, and
  (c) water in an amount sufficient to make 1000 gallons of said composition.
2. The composition of claim 1 wherein the water-soluble gum is guar.
3. In the process of fracturing a subterranean formation traversed by a well wherein a viscous aqueous liquid is forced into the well bore under pressure, the method of sealing said formation against loss of appreciable amounts of said liquid to the formation which comprises incorporating in said viscous aqueous liquid:
  (a) from 40 to 200 pounds per 1000 gallons of a water soluble gum, and
  (b) from 2 to 200 pounds per 1000 gallons of perlite.
4. The process of claim 3 wherein the water-soluble gum is guar.

References Cited
UNITED STATES PATENTS

| | | |
|---|---|---|
| 2,561,075 | 7/1951 | Sidewell. |
| 2,683,690 | 7/1954 | Armentrout _____ 252—5 |
| 2,779,735 | 1/1957 | Brown et al. _____ 252—8.55 |
| 2,861,042 | 11/1958 | Watkins _____ 252—8.5 |
| 3,079,332 | 2/1963 | Wyant _____ 252—8.55 |
| 3,153,450 | 10/1964 | Foster et al. _____ 252—8.55 |

LEON D. ROSDOL, Primary Examiner.
H. B. GUYNN, Assistant Examiner.